(12) United States Patent
Yasunaga et al.

(10) Patent No.: US 9,090,132 B2
(45) Date of Patent: Jul. 28, 2015

(54) PNEUMATIC TIRE

(71) Applicant: TOYO TIRE & RUBBER CO., LTD., Osaka-shi, Osaka (JP)

(72) Inventors: Toshikazu Yasunaga, Osaka (JP); Shingo Kuwano, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 258 days.

(21) Appl. No.: 13/710,993

(22) Filed: Dec. 11, 2012

(65) Prior Publication Data

US 2013/0174955 A1  Jul. 11, 2013

(30) Foreign Application Priority Data

Jan. 5, 2012 (JP) ................................ 2012-000712
Jan. 5, 2012 (JP) ................................ 2012-000717

(51) Int. Cl.
| | |
|---|---|
| *B60C 13/00* | (2006.01) |
| *B60C 13/02* | (2006.01) |
| *B60C 15/00* | (2006.01) |
| *B60C 13/04* | (2006.01) |
| *B60C 15/024* | (2006.01) |

(52) U.S. Cl.
CPC ............. *B60C 13/04* (2013.01); *B60C 15/0242* (2013.04); *B60C 13/001* (2013.04)

(58) Field of Classification Search
CPC .......... B60C 13/00; B60C 13/02; B60C 15/00
See application file for complete search history.

(56) References Cited

U.S. PATENT DOCUMENTS

| | | | | |
|---|---|---|---|---|
| 3,128,815 | A * | 4/1964 | Nonnamaker | ................ 152/524 |
| 2002/0066513 | A1 | 6/2002 | Roesgen et al. | |
| 2009/0229727 | A1 | 9/2009 | Losey et al. | |

FOREIGN PATENT DOCUMENTS

| | | |
|---|---|---|
| DE | 4429216 A1 | 2/1996 |
| JP | 5-155206 A | 6/1993 |
| JP | 11-151918 A | 6/1999 |
| JP | 2011-121447 A | 6/2011 |

OTHER PUBLICATIONS

German Office Action dated Apr. 26, 2013, issued in corresponding German Patent Application No. 10 2012 113 224.0; with English translation (11 pages).

* cited by examiner

*Primary Examiner* — Justin Fischer
(74) *Attorney, Agent, or Firm* — Westerman, Hattori, Daniels & Adrian, LLP

(57) ABSTRACT

An installation members 20 is structured detachably by a fitting structure between a groove portion 12 and a projection 21 extending in a tire peripheral direction CD, with respect to a tire side wall surface 10. a structure in which the groove portion 12 and the projection 21 interfere with each other in the tire peripheral direction is provided between the groove portion 12 and the projection 21.

11 Claims, 12 Drawing Sheets

A1-A1

A2-A2

A3-A3

A4-A4

A5-A5

A6-A6

A7-A7

A6-A6

A8-A8

PNEUMATIC TIRE

BACKGROUND OF THE INVENTION

1. Field of the Invention

The present invention relates to a pneumatic tire in which an installation member is attached to a tire side wall surface.

2. Description of the Related Art

It is often the case where various installation members formed as a circular arc shape or an annular shape are detachably attached to a tire side wall surface which reaches a tread portion from a bead portion via a side wall portion. As one example of the installation member, there can be listed up a rim protector for protecting a rim flange, an ornamental member for decorating and the like.

As one example of the installation member serving as the rim protector, in JP-A-5-155206, there is disclosed a tire structured such that a circular arc shaped rubber protection member serving as the installation member is provided with any one of a projection or a groove portion which extends along a tire peripheral direction, any other of the corresponding groove portion or projection is formed in a tire side wall surface, and the rubber protection member is installed to the tire side wall surface with a fitting structure between the projection and the groove portion.

As one example of the installation member serving as the ornamental member, in JP-A-11-151918, there is disclosed a tire structured such that a collar member having a different color from a tire main body is fitted into a groove portion of a tire side wall surface.

SUMMARY OF THE INVENTION

In the case of traveling in a state in which the installation member is attached to the tire side wall surface as mentioned above, the installation member may relatively move along the tire peripheral direction while maintaining the fitted state to the tire side wall surface, due to centrifugal force caused by a tire rotation or an extension and contraction of the tire side wall portion. In this case, friction is generated between the installation member and the tire, rubber chaffs are generated and the groove portion thins down, so that the installation member tends to fall away.

Further, due to heat generation by the friction, durability of the installation member and the tire side wall surface is significantly lowered.

The present invention is made by paying attention to the problem mentioned above, and an object of the present invention is to provide a pneumatic tire which suppresses a relative movement of an installation member with respect to the tire along a peripheral direction, inhibits the installation member from falling away and improves its durability.

The present invention employs the following means for achieving the object.

In other words, according to the present invention, there is provided a pneumatic tire including:

a pair of bead portions;

side wall portions which extend to outer sides in a tire diametrical direction from the respective bead portions;

a tread portion which connects outer ends in the tire diametrical direction of the side wall portions; and circular arc shaped or annular installation members each of which is structured detachably by a fitting structure between a groove portion and a projection extending in a tire peripheral direction, with respect to a tire side wall surface which reaches the tread portion from the bead portion via the side wall portion, wherein a structure in which the groove portion and the projection interfere with each other in the tire peripheral direction is provided between the groove portion and the projection.

As mentioned above, since the groove portion and the projection interfere with each other in the tire peripheral direction, the relative movement (rotation) of the installation member with respect to the groove portion is suppressed, and the wear of the groove portion is reduced, thereby inhibiting the installation member from falling away. Further, the friction between the installation member and the tire is suppressed, thereby improving the durability.

Further, according to the present invention, there is provided a pneumatic tire including:

a pair of bead portions;

side wall portions which extend to outer sides in a tire diametrical direction from the respective bead portions;

a tread portion which connects outer ends in the tire diametrical direction of the side wall portions; and circular arc shaped or annular installation members each of which is structured detachably by a fitting structure between a groove portion and a projection extending in a tire peripheral direction, with respect to a tire side wall surface which reaches the tread portion from the bead portion via the side wall portion, wherein in a boundary between a partial predetermined area of the groove portion and adjacent areas on both sides in the tire peripheral direction of the predetermined area, paired groove side intersecting surfaces which intersect with or are orthogonal to the tire peripheral direction in a state in which the groove side wall of the predetermined area is notched are provided, and paired projection side intersecting surfaces which intersect with or are orthogonal to the tire peripheral direction in a state in which a projection width of the area corresponding to the predetermined area is expanded are provided at a position corresponding to the boundary in the projection, and wherein the groove side intersecting surfaces and the projection side intersecting surfaces are in a positional relationship that they interfere with each other in the tire peripheral direction in a fitting state of the groove portion and the projection portion.

As mentioned above, since the paired groove side intersecting surfaces formed in the groove portion, and the paired projection side intersecting surfaces formed in the projection are in the positional relationship that they interfere with each other in the tire peripheral direction in the fitted state of the groove portion and the projection, it is possible to suppress the relative movement (rotation) of the installation members. Therefore, the relative movement of the installation member is suppressed, and the wear of the groove portion is reduced, thereby inhibiting the installation member from falling away. Further, the friction between the installation member and the tire is suppressed, thereby improving the durability.

In order to make the installation member hard to fall away, it is preferable that in the paired groove side walls constructing the groove portion, the groove port side position protrudes into the groove than the groove bottom side position.

In order to make the installation member further hard to fall away, it is effective that the groove portion is formed as the approximately T-shaped cross sectional form having the straight position which is orthogonal to the groove depth direction.

In order to appropriately make the prevention of the fall-away of the installation member and the prevention of the relative movement of the installation member compatible, it is desirable that the predetermined area is set at a plurality of positions along the tire peripheral direction, and a first predetermined area in a state in which only the groove side wall on an inner side in the tire diametrical diction is notched, and a second predetermined area in a state in which only the groove side wall on an outer side in the tire diametrical direction is notched are alternately arranged along the tire peripheral direction.

In order to provide a reversible installation member, it is preferable that the installation member has the projection, and a head portion which protrudes out of the tire side wall surface in an installed state, the head portion is formed as a cross sectional shape which is the same as at least a part of the projection, and the installation member is formed in its entirety as a cross sectional shape which is symmetrical in the projection side and the head portion side.

In order to make the installation member function as a rim protector, it is desirable that the installation member is attached to an area from a contact portion with a rim flange to a center portion in the tire diametrical direction among the tire side wall surface.

Further, according to the present invention, there is provided a pneumatic tire including:

a pair of bead portions;

side wall portions which extend to outer sides in a tire diametrical direction from the respective bead portions;

a tread portion which connects outer ends in the tire diametrical direction of the side wall portions; and circular arc shaped or annular installation members each of which is structured detachably by a fitting structure between a groove portion and a projection extending in a tire peripheral direction, with respect to a tire side wall surface which reaches the tread portion from the bead portion via the side wall portion, wherein a plurality of convex portions protruding to a surface in the other end are provided in at least any one of a predetermined surface which is at least a part of the groove surface constructing the groove portion and an opposed surface which is opposed to the predetermined surface in the installation member, and concave portions which interfere with the convex portions in the tire peripheral direction are provided in the surfaces in the other end of the plurality of convex portions.

According to the structure, the convex portions and the concave portions interfere with each other in the tire peripheral direction, thereby suppressing the relative movement (rotation) of the installation member with respect to the tire side wall surface. Therefore, the relative movement of the installation member is suppressed, the wear of the groove portion is reduced, thereby inhibiting the installation member from falling away. Further, the friction between the installation member and the tire is suppressed, thereby improving a durability.

As particular structure thereof, there can be listed up that a plurality of linear convex portions extending along a predetermined direction are arranged in both of the predetermined surface and the opposed surface, and linear concave portions extending along the predetermined direction are formed between the linear convex portions.

In order to increase the fitting between the projection and the groove portion and to suppress the relative movement of the installation member, it is preferable that the predetermined direction is inclined to the tire peripheral direction.

In order to make the rotation prevention of the installation member in the one direction of the tire peripheral direction and an assembling property compatible, it is effective that the linear convex portion has an orthogonal surface which is orthogonal to the tire peripheral direction, on one side in the tire peripheral direction, and an inclined surface which is inclined to the tire peripheral direction, on the other side in the tire peripheral direction.

In order to make the rotation prevention of the installation member in both directions of the tire peripheral direction and the assembling property compatible, it is preferable that in the case where the predetermined surface and the opposed surface are divided into a plurality of areas along the tire peripheral direction, the linear convex portion formed in a first area which is a part of the plurality of areas has an orthogonal surface which is orthogonal to the tire peripheral direction, on one side in the tire peripheral direction, and the linear convex portion formed on the other area than the first area in the plurality of areas has an orthogonal surface which is orthogonal to the tire peripheral direction, on the other side in the tire peripheral direction.

BRIEF DESCRIPTION OF THE DRAWINGS

FIGS. 9A to 9C are views schematically showing a convex portion and a concave portion which are formed between a projection and a groove portion in the second embodiment, in which FIG. 9A is a cross sectional view of a position A6-A6 in FIG. 8, FIG. 9B is a plan view in which a groove bottom surface is seen from a groove depth direction, and FIG. 9C is a cross sectional view of a position A7-A7 in FIG. 9B;

FIGS. 12A and 12B are views schematically showing a groove portion and an installation member according to the other example than the above of the second embodiment, in which FIG. 12A is a perspective view schematically showing the groove portion and the installation member, and FIG. 12B is a tire schematically side elevational view expressing a layout of the groove portion.

DETAILED DESCRIPTION OF THE PREFERRED EMBODIMENTS

First Embodiment

A description will be given below of a pneumatic tire according to a first embodiment of the present invention with reference to the accompanying drawings.

Figure 1:
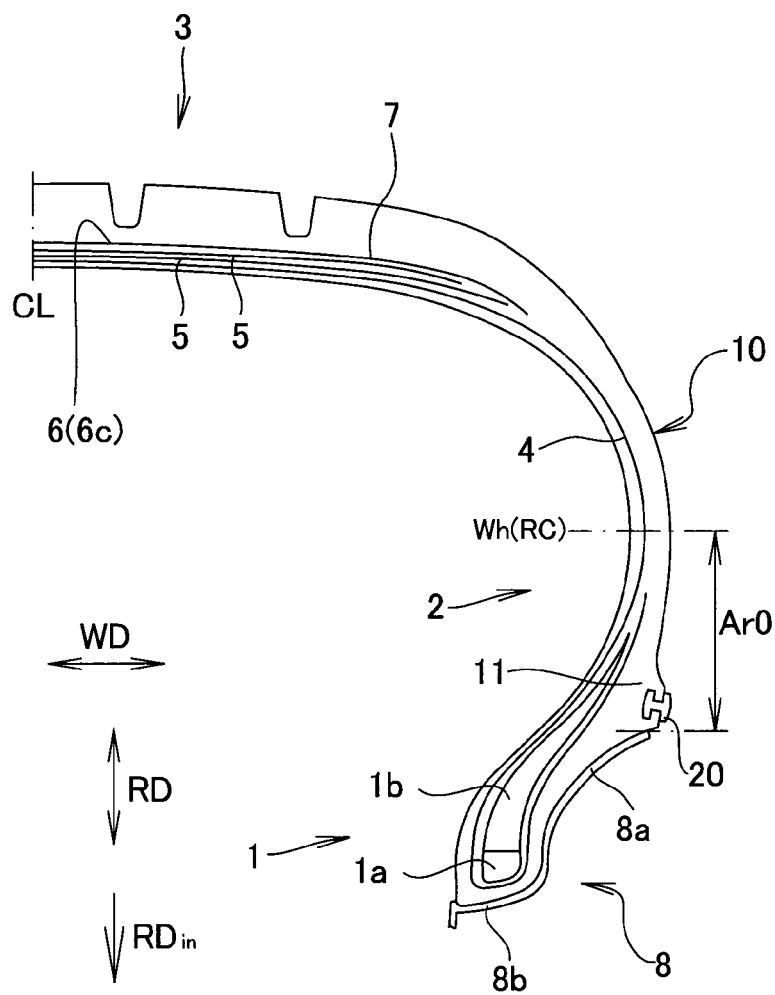
FIG. 1 is a tire meridian half cross sectional view showing one example of a pneumatic tire according to a first embodiment of the present invention.

As shown in FIG. 1, a pneumatic tire is provided with a pair of bead portions 1, side wall portions 2 which extend to outer sides in a tire diametrical direction RD from the respective bead portions 1, and a tread portion 3 which connects outer ends in the tire diametrical direction RD of the side wall portions 2 to each other. In the bead portion 1, there are arranged an annular bead core 1a which is constructed by coating a converged body of a steel wire or the like with rubber, and a bead filler 1b which is made of a hard rubber. The bead portion 1 is installed to a bead seat 8b of a rim 8, and is appropriately fitted to a rim flange 8a by a tire internal pressure as long as a pneumatic pressure is normal (for example, a pneumatic pressure which is determined by JATMA), and a tire is fitted to the rim 8.

Further, the tire is provided with a toroidal carcass layer 4 which is arranged in such a manner as to be bridged between a pair of beads 1 and reaches the bead portion 1 from the tread portion 3 via the side wall portion 2. The carcass layer 4 is constructed by at least one carcass ply, and is locked in a state in which its end portion is rolled up via the bead core 1a. An inner liner rubber (not shown) for retaining a pneumatic pressure is arranged on an inner peripheral side of the carcass layer 4.

A belt layer 5 which reinforces the carcass layer 4 by a hoop effect is arranged in an outer periphery of the carcass layer 4 in the tread portion 3. The belt layer 5 has two belt plies having cords which extend while inclining at a predetermined angle with respect to a tire peripheral direction, and the respective plies are laminated in such a manner that the cords intersect inversely with each other. A belt reinforcing layer 7 is arranged on an outer peripheral side of the belt layer 5, and a tread rubber on which a tread pattern is formed is arranged further on an outer peripheral side surface thereof.

As a raw material rubber of the rubber layer mentioned above, there can be listed up a natural rubber, a styrene butadiene rubber (SBR), a butadiene rubber (BR), an isoprene rubber (IR), an isobutylene-isoprene rubber (IIR) and the like, and they are used by one kind singly or mixing two or more kinds. Further, these rubbers are reinforced by a filler such as a carbon black or a silica, and are approximately blended with a vulcanizing agent, a vulcanization accelerator, a plasticizer, an antioxidant or the like.

Figure 2:
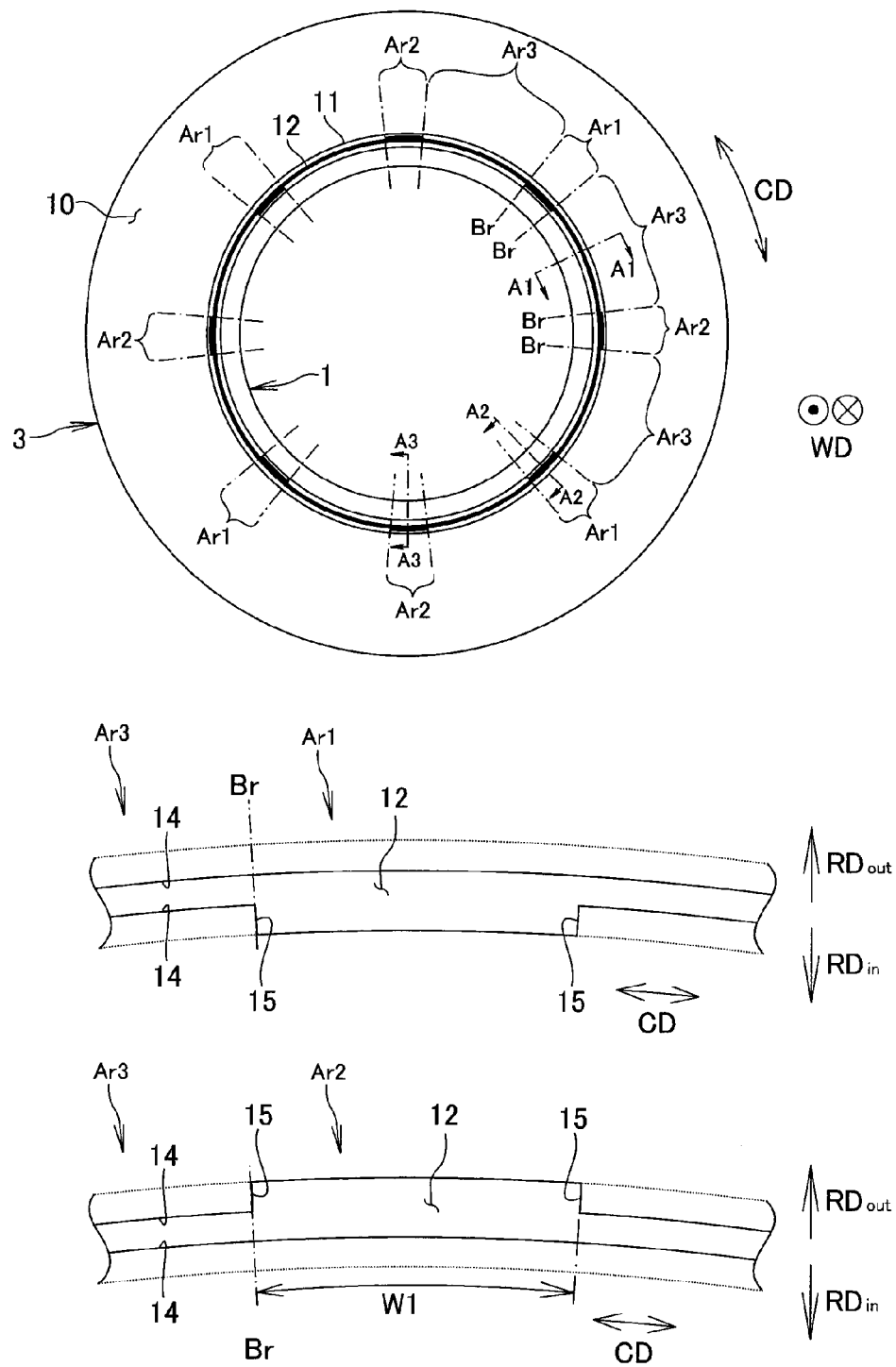
FIG. 2 is a tire side elevational view schematically showing a groove portion which is formed in an annular swelling portion of a tire side wall surface in the first embodiment.

In the present embodiment, as shown in FIG. 1, an annular swelling portion 11 which swell out of the bead portion 1 to an outer side in a tire width direction WD is provided in an area Ar0 from a contact portion with the rim flange 8a to a tire maximum width portion Wh, among a tire side wall surface 10 which reaches the tread portion 3 from the bead portion 1 via the side wall portion 2. In the present embodiment, the tire maximum width portion Wh also corresponds to a center portion RC in the tire diametrical direction. The annular swelling portion 11 extends annularly along the tire peripheral direction CD while forming an approximately trapezoidal shape in a cross section, as shown in FIG. 2 and FIG. 3, and has an inner peripheral side surface 11a which is opposed to an outer peripheral side curved surface of the rim flange 8a, an outer peripheral side surface 11b which is smoothly connected to an outer wall of the tire maximum width portion Wh, and a top surface 11c which connects the inner peripheral surface 11a and the outer peripheral side surface 11b.

Further, as shown in FIG. 1, an annular installation member 20 is attached to the annular swelling portion 11. As shown in FIG. 3 and FIG. 2, a groove portion 12 which is open to an outer side in the tire width direction is formed in the top surface 11c of the annular swelling portion 11. The groove portion 12 extends in the tire peripheral direction CD and is formed as an annular shape. The installation member 20 has a projection 21 which is fitted to the groove portion 12 of the annular swelling portion 11 and extends annularly, as shown in FIG. 3, and is structured such as to be detachable on the basis of a fitting structure between the groove portion 12 and the projection 21.

Figure 3:
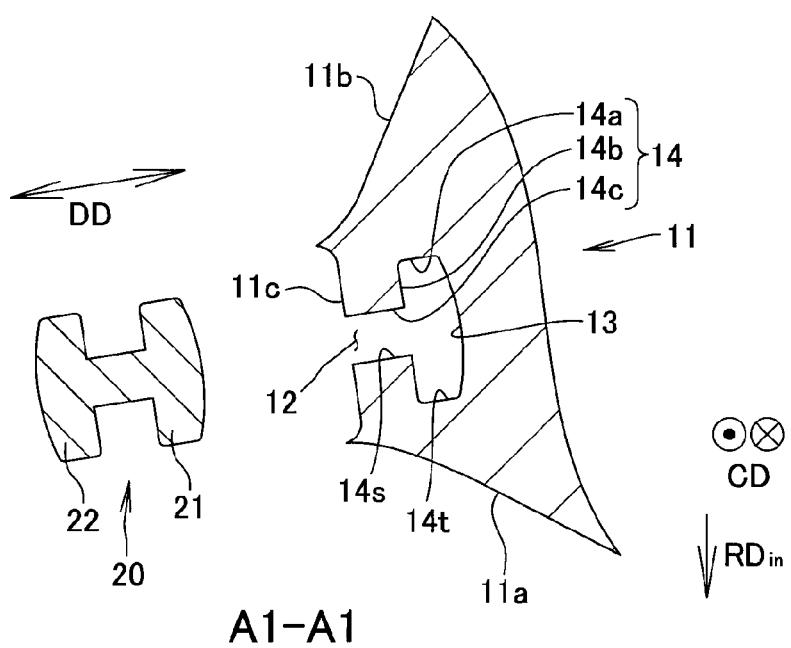
FIG. 3 is a cross sectional view of a position A1-A1 in FIG. 2.

The groove portion 12 is constructed, as shown in FIG. 3, by a groove bottom surface 13, paired first groove side walls 14a and 14a which head for an opening side along a groove depth direction DD from both side ends of the groove bottom surface 13, paired second groove side walls 14b and 14b which head for a groove inner side along a direction which is orthogonal to the groove depth direction DD from an opening side end of the first groove side wall 14a, and paired third groove side walls 14c and 14c which head for an opening side along the groove depth direction DD from a groove inside end of the second grooved side wall 14b. In other words, the groove side wall 14 constructing the groove portion 12 is constructed by the first to third groove side walls 14a, 14b and 14c, and a groove port side position 14s protrudes into the groove inner side than a groove bottom side position 14t. Further, the groove portion 12 is formed as an approximately T-shaped cross sectional form having a straight line position (the second groove side wall 14b) which is orthogonal to the groove depth direction DD.

The installation member 20 has a projection 21 which corresponds to the groove portion 12 and is formed as an approximately T-shaped cross sectional form, and a head portion 22 which protrudes out of the top surface 11c (the tire side wall surface) in an installed state, as shown in FIG. 3, and the head portion 22 is formed as a cross sectional shape which is identical to at least a part of the projection 21, and is formed as a cross sectional shape (approximately H-shaped form) which is symmetrical in a projection side and a head portion side as a whole of the installation member 20. It is preferable that a hardness of the installation member 20 has a hardness which is equal to or higher than the rubber forming the tire side wall surface 10. A material of the installation member 20 is preferably rich in elasticity, however, may employ an appropriate rubber or resin. As long as the resin material, there can be listed up, for example, a thermoplastic elastomer (a polyester elastomer, a polyolefin elastomer, a polyamide elastomer, a polystyrene elastomer, a polyvinyl chloride elastomer, a polyurethane elastomer and the like), and a thermosetting elastomer (a polyurethane elastomer and the like). Further, various colors can be employed in the installation member 20; however, it is possible to enhance an ornamental property by employing a different color from the tire side wall surface 10.

In the meantime, in the structure mentioned above, there is fear that the installation member 20 relatively moves along the tire peripheral direction CD with respect to the tire side wall surface 10, in a state in which the groove portion 12 and the projection 21 are fitted to each other, on the basis of a centrifugal force of the tire and an extension and contraction of the tire side wall portion.

Accordingly, in order to effectively prevent the relative movement, the following means are taken.

Figure 4A:
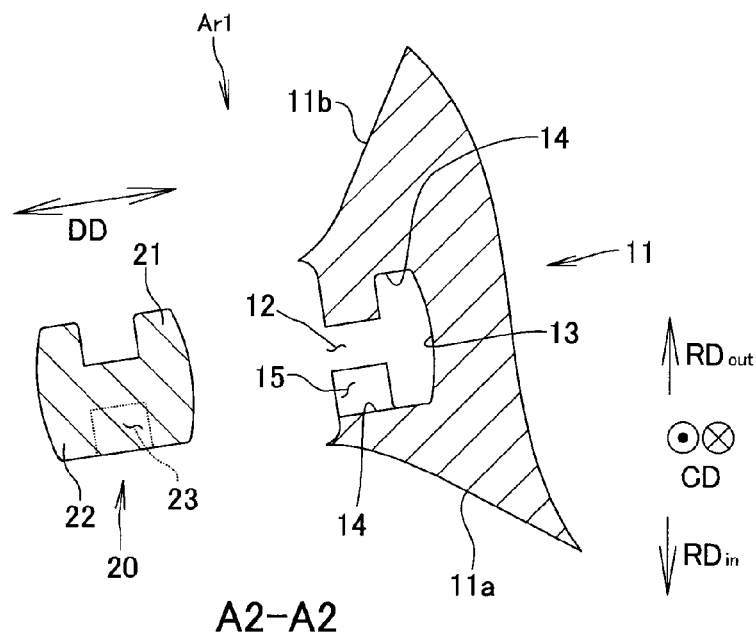
FIG. 4A is a cross sectional view of a position A2-A2 in FIG. 2.
Figure 4B:
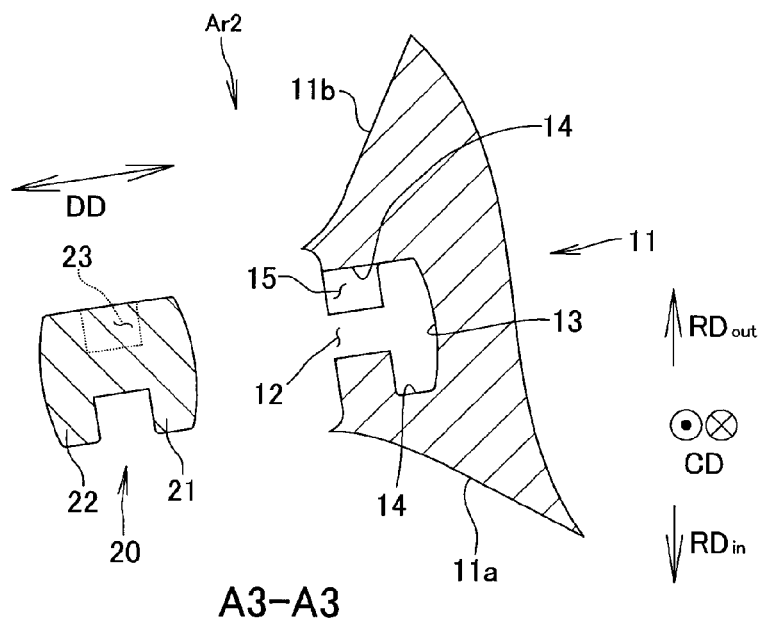
FIG. 4B is a cross sectional view of a position A3-A3 in FIG. 2.

In other words, in the case where the groove portion 12 is divided into a plurality of areas Ar1 to Ar3 in the tire peripheral direction, and a part of a plurality of areas is set to a predetermined area Ar1 (Ar2) as shown in FIG. 2, the groove side wall 14 of the predetermined area Ar1 (Ar2) is set to a notched state as shown in FIGS. 4A and 4B, and paired groove side intersecting surfaces 15 and 15 which are orthogonal to the tire peripheral direction CD are provided in a boundary Br between adjacent areas Ar3 existing on both sides in the tired peripheral direction of the predetermined area Ar1 (Ar2), and the predetermined area Ar1 (Ar2) (refer to FIG. 2 and FIG. 4).

Further, as shown in FIGS. 4A and 4B, a projection width of the area corresponding to the predetermined area Ar1 (Ar2) in the projection 21 is set to an expanded state, and paired projection side intersecting surfaces 23 which are orthogonal to the tire peripheral direction CD are provided at a position corresponding to the boundary Br mentioned above. The positional relationships of the groove side intersecting surface 15 and the projection side intersecting surface 23 are defined in such a manner as to interfere with each other in the tire peripheral direction CD in the fitted state of the groove portion 12 and the projection 21.

In the present embodiment, as shown in FIG. 2 and FIG. 4, the predetermined area Ar1 (Ar2) is set at a plurality of positions (eight positions) along the tire peripheral direction, and the first predetermined area Ar1 in a state in which only the groove side wall 14 on an inner side $RD_{in}$ in the tire diametrical direction is notched as shown in FIG. 4A, and the second predetermined area Ar2 in a state in which only the groove side wall 14 on an outer side $RD_{out}$ in the tire diametrical direction is notched as shown in FIG. 4B are arranged alternately along the tire peripheral direction CD. In other words, as shown in FIG. 2, the groove side intersecting surface 15 is formed on the inner side $RD_{in}$ in the tire diametrical direction in the boundary Br between the first predetermined area Ar1 and the adjacent area Ar3, the groove side intersecting surface 15 is formed on the outer side $RD_{out}$ in the tire diametrical direction in the boundary Br between the second predetermined area Ar2 and the adjacent area Ar3, and the groove side intersecting surfaces 15 are arranged in a zigzag manner along the tire peripheral direction CD. A cross sectional shape of the projection 21 of the installation member 20 is set to a shape which corresponds to the cross sectional shape of the groove portion 12.

The predetermined area Ar1 (Ar2) which is the notched position of the groove portion 12 may be provided at least on one position, however, is preferably provided at a plurality of positions such as the present embodiment. As a preferable set number, one to sixteen positions can be listed up. In the present embodiment, a length W1 (refer to FIG. 2) in the tire peripheral direction of the predetermined area Ar1, that is, the notch is 30 mm, however, may be appropriately changed. Depending on an elasticity of a tire side wall surface in which the groove portion is formed, it is preferable to set to 5 to 100 mm.

As mentioned above, in the pneumatic tire according to the present embodiment, since the paired groove side intersecting surfaces 15 formed in the groove portion 12, and the paired projection side intersecting surfaces 23 formed in the projection 21 are in the positional relationship that they interfere with each other in the tire peripheral direction CD in the fitted state of the groove portion 12 and the projection 21, the groove side intersecting surfaces 15 and the projection side intersecting surfaces 23 interfere with each other in the case where the installation members 20 are going to relatively move along the tire peripheral direction CD, whereby it is possible to suppress the relative movement (rotation) of the installation members 20. Therefore, the relative movement of the installation member 20 is suppressed, and the wear of the groove portion 12 is reduced, thereby inhibiting the installation member 20 from falling away. Further, the friction between the installation member 20 and the tire is suppressed, thereby improving the durability.

In the present embodiment, in the paired groove side walls 14 constructing the groove portion 12, since the groove port side position 14s protrudes into the groove than the groove bottom side position 14t, the groove port side position 14s of the groove side wall 14 is caught in the projection 21 of the installation member 20, and it is possible to make the installation member 20 hard to fall away since both sides of the projection 21 are caught in the width direction.

Particularly, in the present embodiment, since the groove portion 12 is formed as the approximately T-shaped cross sectional form having the straight position (the second groove side wall 14b) which is orthogonal to the groove depth direction DD, it is possible to make the installation member 20 further hard to fall away by the second groove side wall 14b (the straight portion which is orthogonal to the groove depth direction).

Further, in the present embodiment, since the predetermined area Ar1 (Ar2) is set at a plurality of positions along the tire peripheral direction CD, and the first predetermined area Ar1 in the state in which only the groove side wall 14 of the inner side $RD_{in}$ in the tire diametrical direction is notched, and the second predetermined area Ar2 in a state in which only the groove side wall 14 of the outer side $RD_{out}$ in the tire diametrical direction is notched are alternately arranged along the tire peripheral direction CD, the installation member 20 is harder to fall away in comparison with the case where both the paired groove side walls 14 and 14 are notched, and it is possible to appropriately make the prevention of the fall-away of the installation member 20 and the prevention of the relative movement of the installation member 20 compatible.

Further, in the present embodiment, since the installation member 20 has the projection 21, and the head portion 22 which protrudes out of the tire side wall surface 10 in the installed state, the head portion 22 is formed as the same cross sectional shape as at least a part of the projection 21, and the installation member 20 is formed in its entirety as the approximately H-shaped cross sectional form which is symmetrical on the projection side and the head portion side, it is possible to fit the head portion 22 to the groove portion 12 so as to utilize the projection 21 as the head portion even in the case where the head portion 22 is injured, thereby providing a reversible installation member 20.

In addition, in the present embodiment, the installation member 20 can be attached to the area from the contact portion with the rim flange 8a to the center portion RC in the tire diametrical direction among the tire side wall surface 10, thereby making the installation member 20 function as a rim protector.

Figure 5:
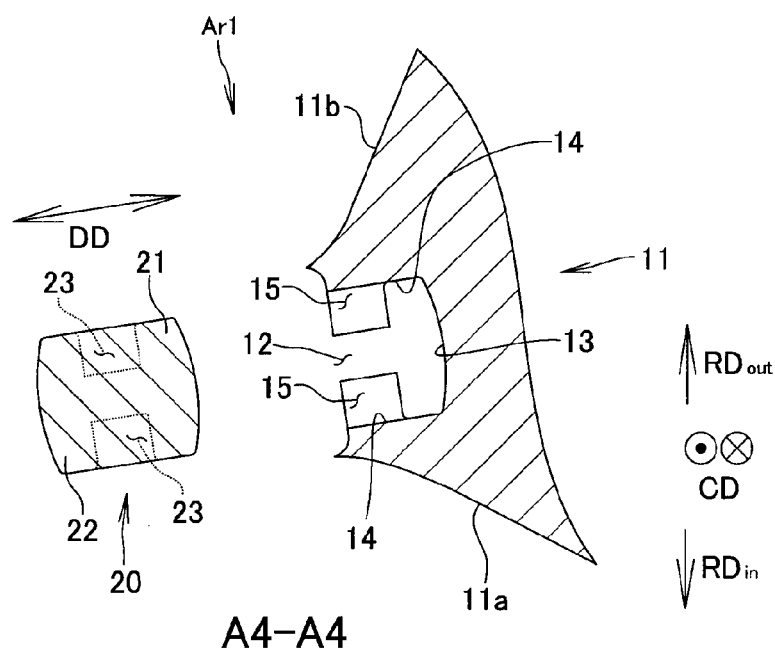
FIG. 5 is a view showing a groove portion of a tire side wall surface and a projection of an installation member according to a modified example of the first embodiment.
Figure 5:
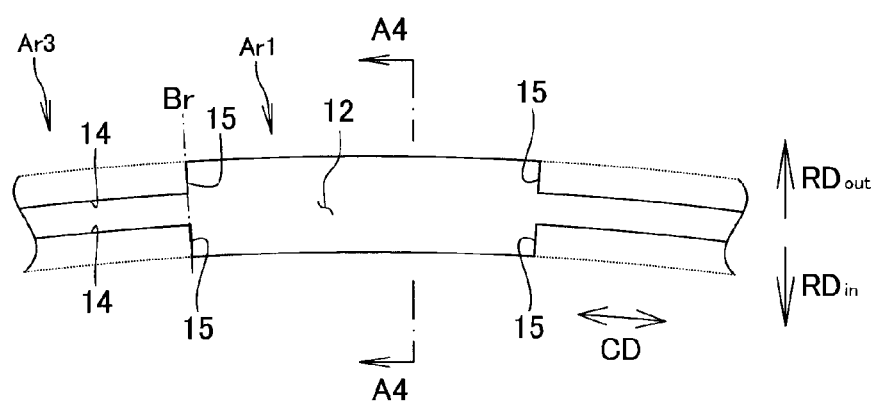

Modified Example of First Embodiment (1) In the present embodiment, as shown in FIG. 4, only the groove side wall 14 in any one of the tire diametrical directions RD is set to the notched state, and the groove side intersecting surface 15 is formed only in any one of the tire diametrical directions RD, in the single predetermined area, however, as shown in FIG. 5, the groove side walls 14 in both sides in the tire diametrical directions RD may be set to the notched state, and the groove side intersecting surface 15 may be formed in both sides in the tire diametrical directions RD. Of course, the cross sectional shape of the projection 21 of the installation member 20 is set to a shape which corresponds to the cross sectional shape of the groove portion 12.

Figure 6:
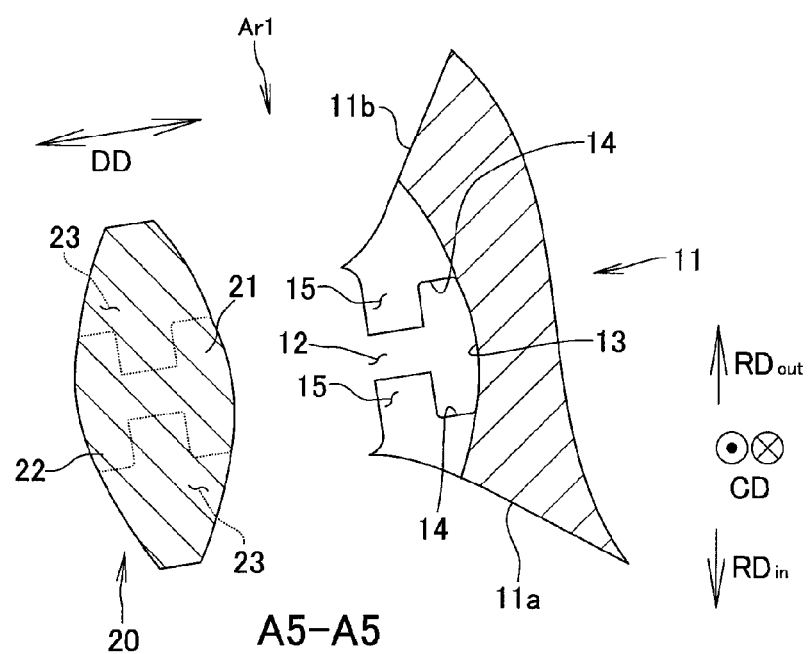
FIG. 6 is a view showing a groove portion of a tire side wall surface and a projection of an installation member according to the other modified example than the above of the first embodiment.
Figure 6:
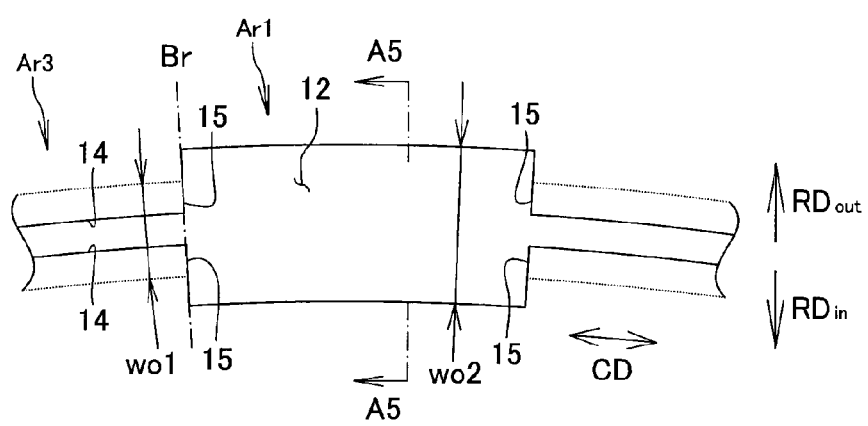

(2) In the embodiment mentioned above, the notch width of the groove portion 12 is kept within the range of the groove bottom width, however, as shown in FIG. 6, the groove side wall 14 of the groove portion 12 may be completely notched. In the case where the width of the installation member 20 is set to the width which corresponds to the notch width of the groove portion 12, in order to hold down the mass of the installation member 20 so as to inhibit the installation member 20 from falling away and rotating, it is preferable to keep a notch width wo2 (a cross sectional width) of the groove portion 12 equal to or less than twice a groove bottom width wo1 (a cross sectional width) of the groove portion 12, as shown in FIG. 6.

Figure 7A:
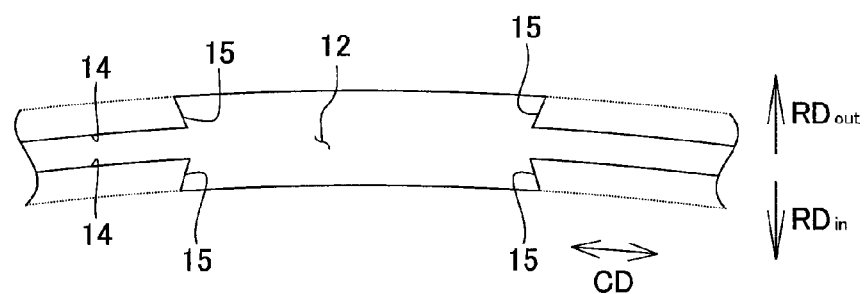
FIGS. 7A and 7B are views showing a groove portion of a tire side wall surface and a projection of an installation member according to the other modified example than the above of the first embodiment.
Figure 7B:
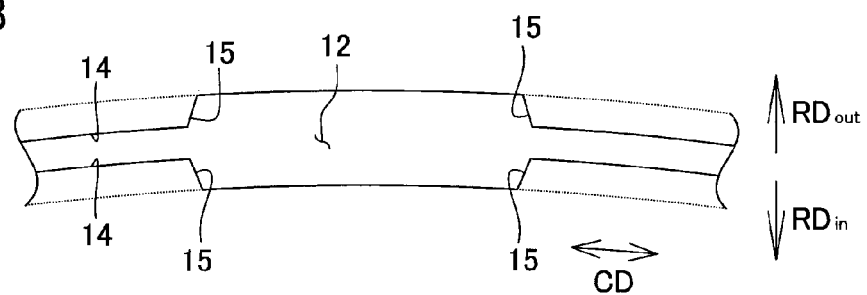
Figure 8:
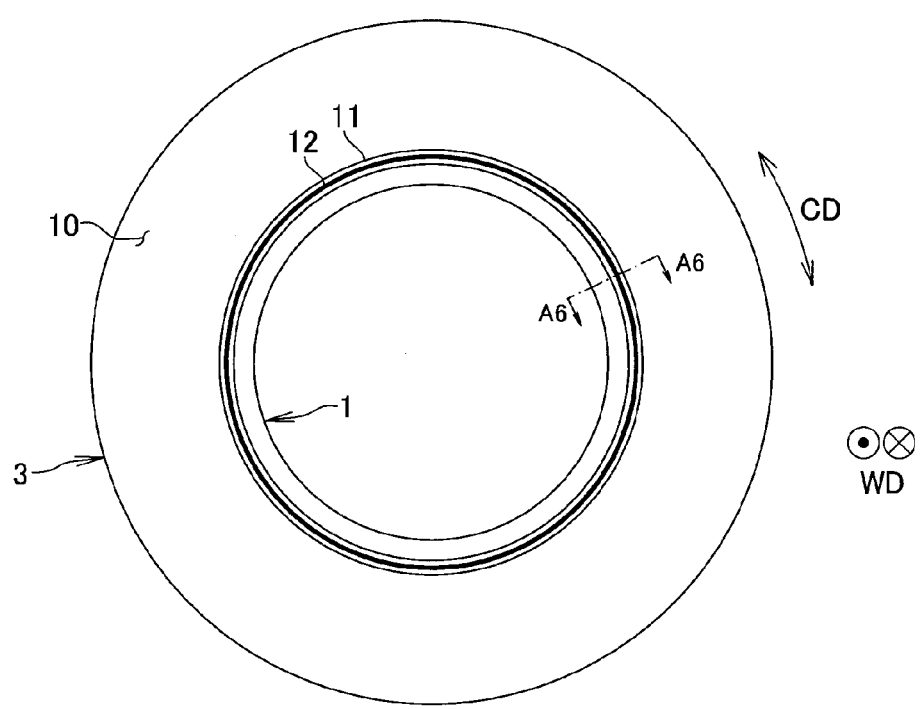
FIG. 8 is a tire side elevational view schematically showing a groove portion which is formed in an annular swelling portion of a tire side wall surface according to a second embodiment of the present invention.

(3) In the embodiment mentioned above, the groove side intersecting surface 15 and the projection side intersecting surface 23 are orthogonal to the tire peripheral direction CD, however, may intersect in the tire peripheral direction, as shown in FIG. 7A and FIG. 7B. It is preferable that an angle of incline with respect to the tire peripheral direction is equal to or more than 45 degree.

(4) Further, in the embodiment mentioned above, the installation member 20 is formed as the annular shape, however, may be formed as a circular arc shape. In the case where the installation member is formed as the circular arc shape, it is preferable to arrange at a plurality of positions along the tire peripheral direction. The groove portion 12 and the projection 21 may be formed as a circular arc shape along the tire peripheral direction.

(5) Further, in the present embodiment, the projection 21 is provided in the installation member side, and the groove portion 12 is provided in the tire side wall surface side, however, they may be reversely provided.

(6) In addition, the position at which the installation member is attached may be set to any position as long as it is on the tire side wall surface. For example, it may be provided in a shoulder portion for decoration. In order to make the installation member function as the rim protector such as the present embodiment, it is preferable to set within a range between 0 and 50 mm from a contact portion with the rim flange 8a in the tire side wall surface.

EXAMPLES

In order to specifically show the structure and the effect of the present invention, the tires of the following example were installed to an actual car (domestically produced 3000 cc class FR sedan), and were traveled on an open road under a load condition of one person riding, and the rotation (the relative movement) and the fall-away of the installation member 20 (the ring) were evaluated. The tire size is 225/45R18, and the number of the evaluated tires is twenty four. If the ring (the installation member 20) moved at 5 degrees or more from the initial position in the tire peripheral direction, the ring was assumed to rotate, and if the rubber chaffs are generated at a predetermined amount or more even if the ring (the installation member 20) is at the initial position, the ring was assumed to rotate.

Comparative Example

The installation member 20 in which the projection having the cross sectional shape in FIG. 3 was formed was installed to the tire side wall surface in which the groove portion having the cross sectional shape shown in FIG. 3 was formed.

Example 1

With respect to the tire according to the comparative example, the predetermined area having the cross sectional shape shown in FIG. 6 was provided at four positions along the tire peripheral direction, in the projection of the installation member and the groove portion of the tire side wall surface. A length in the tire peripheral direction of the notch is 30 mm.

Example 2

With respect to the tire according to the example 1, the cross sectional shape of the predetermined area was changed to a cross sectional shape shown in FIG. 5. The other structures were set to the same as the example 1.

Example 3

With respect to the tire according to the comparative example, the first predetermined area Ar1 having the cross sectional shape shown in FIG. 4A, and the second predetermined area Ar2 having the cross sectional shape shown in FIG. 4B were alternately arranged along the tire peripheral direction CD, in the projection of the installation member and the groove portion of the tire side wall surface. The predetermined areas are provided totally at eight positions. A length in the tire peripheral direction of the notch is 30 mm.

TABLE 1

| Evaluation contents | Comparative example 1 | Example 1 | Example 2 | Example 3 |
| --- | --- | --- | --- | --- |
| Ring rotating number | 20 | 4 | 2 | 0 |
| Ring falling-away number | 10 | 2 | 1 | 0 |

In both of the rotating number and the falling-away number of the ring (the installation member 20), it is known that they are held down in the examples 1 to 3 in comparison with the comparative example 1. Particularly, in the example 3, it is known that the rotation and the falling-away are accurately prevented.

Second Embodiment

A description will be given below of a pneumatic tire according to a second embodiment of the present invention with reference to the accompanying drawings. The same reference numerals are attached to the same members as those of the first embodiment, and a description thereof will be omitted.

Figure 9A:
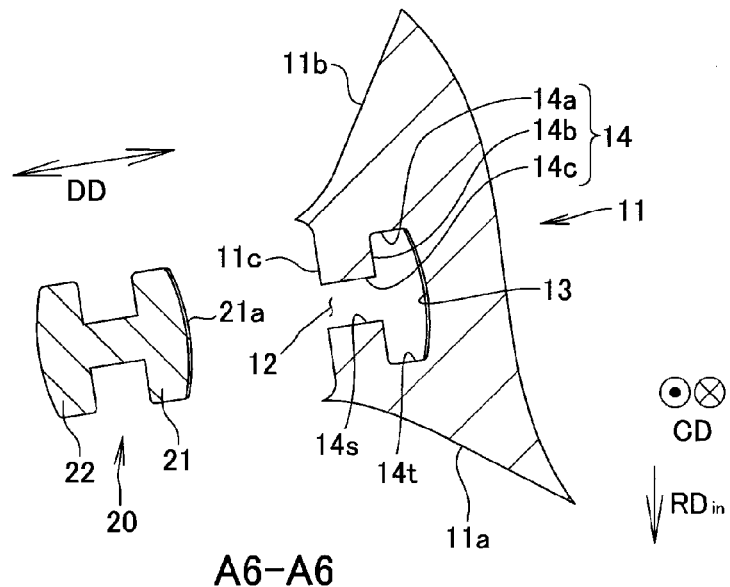
Figure 9B:
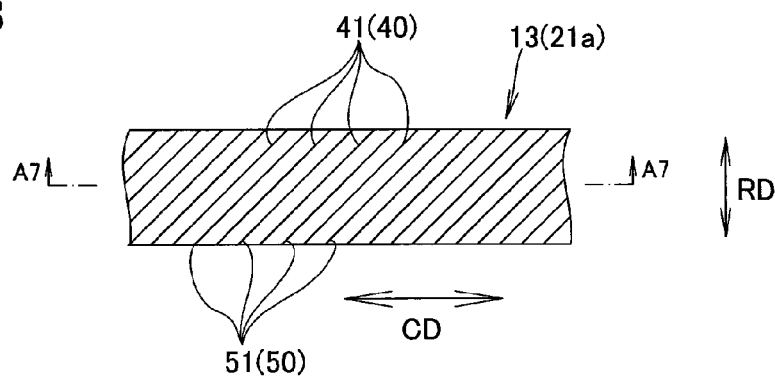
Figure 9C:
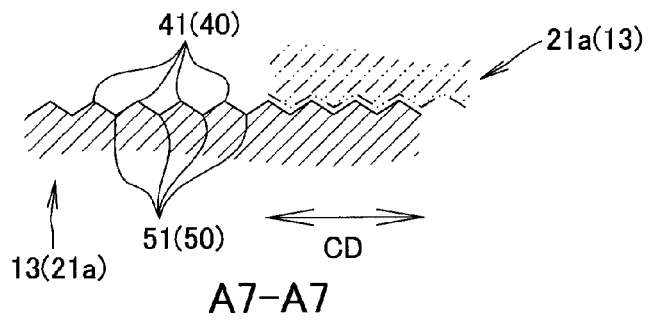

As shown in FIGS. 9A, 9B and 9C, a plurality of convex portions 40 protruding to the other end surface are provided in both surfaces (the groove bottom surface 13 and an opposed surface 21a) including the groove bottom surface 13 which is a partial predetermined surface in a groove surface (the groove bottom surface 13 and the groove side wall 14) constructing the groove portion 12, and the opposed surface 21a which is opposed to the groove bottom surface 13 corresponding to the predetermined surface in the installation member 20, and a plurality of concave portions 50 which interfere with the convex portions 40 in the tire peripheral direction CD are provided in surfaces in the other end of a plurality of convex portions 40.

Specifically, the plurality of convex portions 40 are formed by arranging a plurality of linear convex portions 41 which extend along a predetermined direction which is inclined to the tire diametrical directions RD. The plurality of concave portions 50 are structured such that linear concave portions 51 extending along the predetermined direction are formed between a plurality of linear convex portions 41. Heights of the linear convex portion 41 and the linear concave portion 51 are 0.3 mm, and a pitch of the linear convex portions 41 (the linear concave portions 51) is set to 1 mm. The linear convex portions 41 and the linear concave portions 51 are jagged knurls.

As mentioned above, in the pneumatic tire according to the present embodiment, a plurality of convex portions 40 protruding to the other end surface are provided in both the surfaces of the partial groove bottom surface 13 in the groove surface (the groove bottom surface 13 and the groove side wall 14) constructing the groove portion 12, and the opposed surface 21a which is opposed to the groove bottom surface 13 in the installation member 20, and the concave portions 50 interfering with the convex portions 40 in the tire peripheral direction are provided in the surface in the other end of the plurality of convex portions 40. According to the structure, the convex portions 40 and the concave portions 50 interfere with each other in the tire peripheral direction CD, thereby suppressing the relative movement (rotation) of the installation member 20 with respect to the tire side wall surface 10. Therefore, the relative movement of the installation member 20 is suppressed, the wear of the groove portion 12 is reduced, thereby inhibiting the installation member 20 from falling away. Further, the friction between the installation member 20 and the tire is suppressed, thereby improving a durability.

In the present embodiment, since a plurality of linear convex portions 41 extending along the predetermined direction are arranged in both the surfaces of the groove bottom surface 13 corresponding to the predetermined surface and the opposed surface 21a, and the linear concave portions 51 extending along the predetermined direction are formed between the linear convex portions 41, the fitting between the projection 21 and the groove portion 12 increases, and it is possible to suppress the relative movement of the installation member 20.

Particularly, in the present embodiment, since the predetermined direction is inclined with respect to the tire peripheral direction CD, it is possible to long secure the linear convex portions 41 and the linear concave portions 51, which can be arranged per unit area of the groove bottom surface 13 corresponding to the predetermined surface and the opposed surface 21a. Therefore, the fitting between the projection 21 and the groove portion 12 increases more, thereby further suppressing the relative movement of the installation member 20.

Figure 10A:
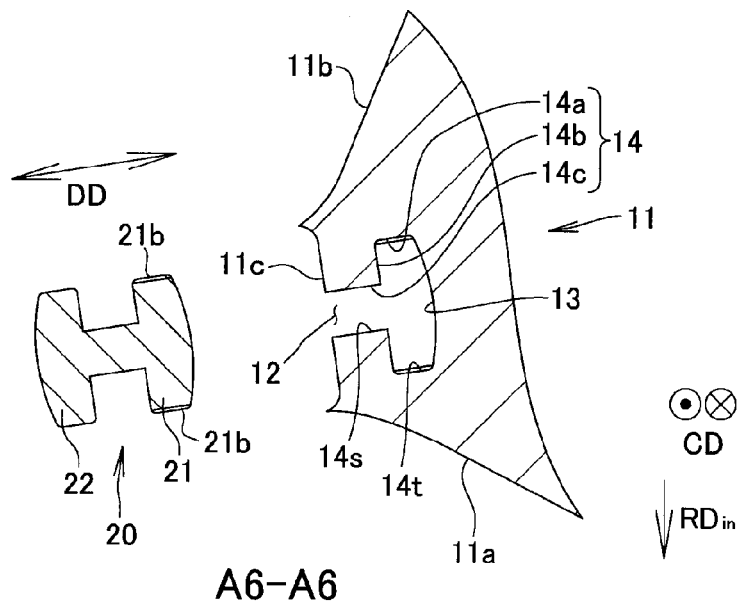
FIGS. 10A to 10C are views schematically showing a convex portion and a concave portion which are formed between a projection and a groove portion according to a modified example of the second embodiment.
Figure 10B:
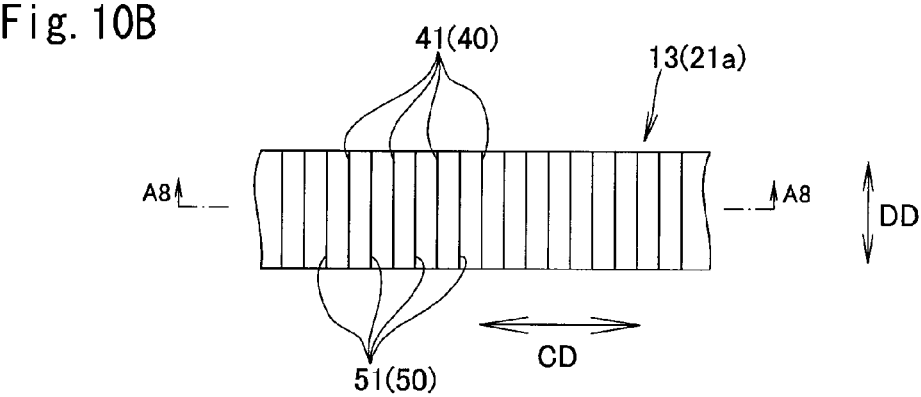
Figure 10C:
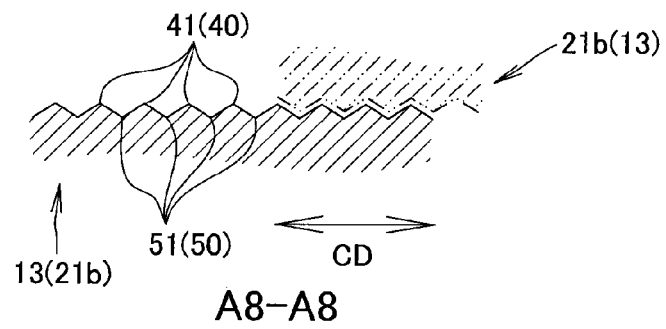

Modified Example of Second Embodiment (1) In the present embodiment, as shown in FIG. 9, the linear convex portions 41 and the linear concave portions 51 are formed in the groove bottom surface 13 constructing the groove portion 12, however, may be provided in a whole of the groove surfaces constructing the groove portion 12. Further, in the case where they are provided in a part of the groove surface, they may be provided at various positions. For example, as shown in FIG. 10, the linear convex portions 41 and the linear concave portions 51 may be provided in the first groove side walls 14a and 14a and the corresponding surfaces 21b, and may be provided in the second groove side walls 14b and the third groove side walls 14c. In the case where they are provided in the second groove side walls 14b, the fitting increases at a time when the installation member 20 is going to come off. Therefore, this is preferable in the light of preventing the relative movement of the installation member 20.

(2) Further, the predetermined direction in which the linear convex portions 41 and the linear concave portions 51 extend can be variously changed as long as it is a direction which intersects with the tire peripheral direction CD. For example, as shown in FIG. 10, a direction which is orthogonal to the tire peripheral direction CD can be listed up.

(3) Further, in the embodiment mentioned above, the installation member 20 is formed as the annular shape, however, may be formed as a circular arc shape. In the case where the installation member is formed as the circular arc shape, it is preferable to arrange at a plurality of positions along the tire peripheral direction. The groove portion 12 and the projection 21 may be formed as a circular arc shape along the tire peripheral direction.

(4) Further, in the present embodiment, the projection 21 is provided in the installation member side, and the groove portion 12 is provided in the tire side wall surface side, however, they may be reversely provided.

(5) In addition, the position at which the installation member is attached may be set to any position as long as it is on the tire side wall surface. For example, it may be provided in a shoulder portion for decoration. In order to make the installation member function as the rim protector such as the present embodiment, it is preferable to set within a range between 0 and 50 mm from the contact portion with the rim flange 8a in the tire side wall surface.

Figure 11:
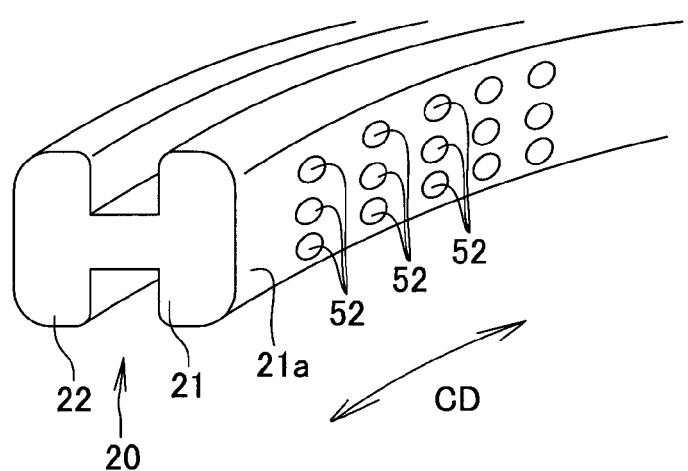
FIG. 11 is a perspective view schematically showing an installation member according to the other modified example than the above of the second embodiment.

(6) Further, in the present embodiment, the convex portions 40 are provided in both the surfaces of the groove bottom surface 13 corresponding to the predetermined surface and the opposed surface 21a thereto, and the convex portions 40 are set in the positional relationship that the convex portions 40 interfere with each other in the peripheral direction, however, the present invention is not limited to this. In other words, the convex portions may be provided only in any one surface of the groove bottom surface corresponding to the predetermined surface and the opposed surface thereto, and the corresponding concave portions may be provided in the surface in the other end. For example, as shown in FIG. 11, a plurality of dimple-like convex portions (not shown) protruding to the surface 21a in the other end are provided in the groove bottom surface 13 corresponding to the predetermined surface in the groove surface constructing the groove portion 12, and dimple-like concave portions 52 interfering with the dimple-like convex portions in the tire peripheral direction CD are provided in the surface 21a in the other end of the plurality of dimple-like convex portions. The dimple-like convex portions and the dimple-like concave portions 52 are formed as a partial spherical shape, and preferably have a diameter between 0.3 mmφ and 3.0 mmφ. Further, a depth of the dimple is preferably equal to or more than 0.15 mm.

Figure 12A:
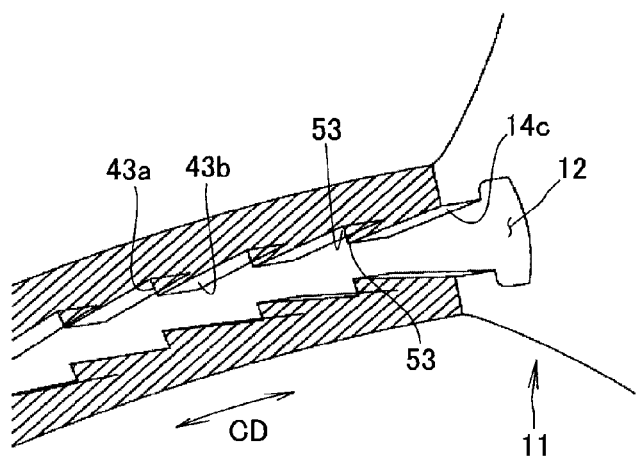

(7) Further, as shown in FIG. 12A, linear convex portions 43 and linear concave portions 53 may be provided in the third groove side wall 14c constructing the groove portion 12. The linear convex portion 43 has in one side in the tire peripheral direction CD an orthogonal surface 43a which is orthogonal to the tire peripheral direction CD, and has on the other side in the tire peripheral direction CD an inclined surface 43b which is inclined to the tire peripheral direction CD. According to the structure mentioned above, the rotation of the installation member 20 to one direction of the tire peripheral direction CD is effectively prevented by the orthogonal surface 43a, and the rotation of the installation member 20 on the other of the tire peripheral direction CD can be allowed. Therefore, it is possible to make the rotation prevention of the installation member 20 in the one direction of the tire peripheral direction and an assembling property compatible.

Figure 12A:
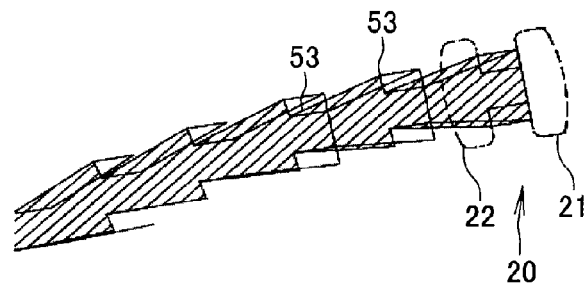
Figure 12B:
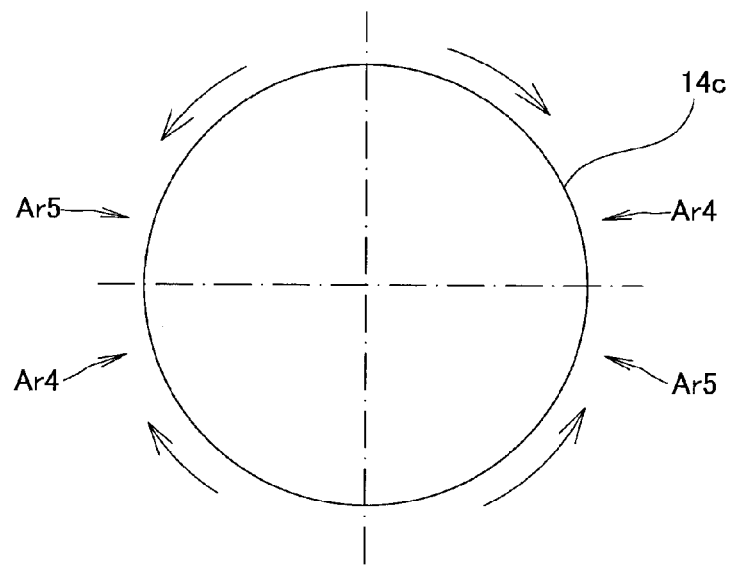

(8) Particularly, as shown in FIG. 12B, in the case where the third groove side wall 14c corresponding to the predetermined surface and the opposed surface thereto are divided into a plurality of areas Ar4 (Ar5) along the tire peripheral direction CD, the linear convex portions 43 formed in the fourth area Ar4 which is apart of a plurality of areas have the orthogonal surfaces 43a which are orthogonal to the tire peripheral direction, on one side (shown by a counterclockwise arrow) in the tire peripheral direction, and the linear convex portions 43 formed in the other fifth area Ar5 than the fourth area Ar4 in a plurality of areas have the orthogonal surfaces 43a which are orthogonal to the tire peripheral direction, on the other side (shown by a clockwise arrow) in the tire peripheral direction CD. According to the structure, it is possible to make the rotation prevention of the installation member 20 in both directions of the tire peripheral direction CD and the assembling property compatible.

EXAMPLES

In order to specifically show the structure and the effect of the present invention, the tires of the following example were installed to an actual car (domestically produced 3000 cc class FR sedan), and were traveled on an open road under a load condition of one person riding, and the rotation (the relative movement) and the fall-away of the installation member 20 (the ring) were evaluated. The tire size is 225/45R18, and the number of the evaluated tires is twenty four. If the ring (the installation member 20) moved at 5 degrees or more from the initial position in the tire peripheral direction, the ring was assumed to rotate, and if the rubber chaffs are generated at a predetermined amount or more even if the ring (the installation member 20) is at the initial position, the ring was assumed to rotate.

Comparative Example

The installation member 20 in which the projection having the cross sectional shape in FIG. 9A was formed was installed to the tire side wall surface in which the groove portion having the cross sectional shape shown in FIG. 9A was formed. In this case, the convex portions 40 and the concave portions 50 are not formed.

Example 1

With respect to the tire according to the comparative example, the linear convex portions 41 and the linear concave portions 51 shown in FIG. 10 were provided in the projection of the installation member and the groove portion of the tire side wall surface. The other structures were set to the same as those of the comparative example.

Example 2

With respect to the tire according to the comparative example, the linear convex portions 41 and the linear concave portions 51 shown in FIG. 9 were provided in the projection of the installation member and the groove portion of the tire side wall surface. The other structures were set to the same as those of the comparative example.

Example 3

With respect to the tire according to the comparative example, the dimple-like convex portions shown in FIG. 11 were provided in the groove portion of the tire side wall surface, and the dimple-like concave portions 52 shown in FIG. 11 were provided in the projection 21 of the installation member 20. The other structures were set to the same as those of the comparative example.

Example 4

With respect to the tire according to the comparative example, the linear convex portions 43 and the linear concave portions 53 shown in FIG. 12 were provided in the projection of the installation member and the groove portion of the tire side wall surface. The other structures were set to the same as those of the comparative example.

TABLE 2

| Evaluation contents | Comparative Example | Example 1 | Example 2 | Example 3 | Example 4 |
|---|---|---|---|---|---|
| Ring rotating number | 20 | 2 | 2 | 3 | 2 |
| Ring falling-away number | 10 | 1 | 1 | 2 | 1 |

In both of the rotating number and the falling-away number of the ring (the installation member 20), it is known that they are held down in the examples 1 to 4 in comparison with the comparative example 1.

In other words, the pneumatic tire according to the present invention is provided with a pair of bead portions 1, the side wall portions 2 which extend to the outer side $RD_{out}$ in the tire diametrical direction from the respective bead portions 1, the tread portion 3 which connects the outer ends in the tire diametrical direction of the side wall portions 2, and the circular arc shaped or annular installation members 20 structured such as to be detachable by the fitting structure of the groove portion 12 and the projection 21 extending in the tire peripheral direction CD, with respect to the tire side wall surface 10 which reaches the tread portion 3 from the bead portions 1 via the side wall portions 2, and the structure in which the groove portion 12 and the projection 21 interfere with each other in the tire peripheral direction is provided between the groove portion 12 and the projection 21.

As mentioned above, since the groove portion 12 and the projection 21 interfere with each other in the tire peripheral direction, the relative movement (rotation) of the installation member 20 with respect to the groove portion 12 is suppressed, and the wear of the groove portion 12 is reduced, thereby inhibiting the installation member 20 from falling away. Further, the friction between the installation member 20 and the tire is suppressed, thereby improving the durability.

The structure employed in each of the embodiments mentioned above can be employed in the other optional embodiment. The specific structure of each of the portions is not limited to the embodiments mentioned above, but can be variously modified within a range which does not deflect from the scope of the present invention.

What is claimed is:

1. A pneumatic tire comprising:
a pair of bead portions;
side wall portions which extend to outer sides in a tire diametrical direction from the respective bead portions;
a tread portion which connects outer ends in the tire diametrical direction of the side wall portions; and
circular arc shaped or annular installation members each of which is structured detachably by a fitting structure between a groove portion and a projection extending in a tire peripheral direction, with respect to a tire side wall surface which reaches the tread portion from the bead portion via the side wall portion,
wherein a structure in which the groove portion and the projection interfere with each other in the tire peripheral direction is provided between the groove portion and the projection,
wherein in a boundary between a partial predetermined area of the groove portion and adjacent areas on both sides in the tire peripheral direction of the predetermined area, paired groove side intersecting surfaces which intersect with or are orthogonal to the tire peripheral direction in a state in which the groove side wall of the predetermined area is notched are provided, and paired projection side intersecting surfaces which intersect with or are orthogonal to the tire peripheral direction in a state in which a projection width of the area corresponding to the predetermined area is expanded are provided at a position corresponding to the boundary in the projection, and
wherein the groove side intersecting surfaces and the projection side intersecting surfaces are in a positional relationship that they interfere with each other in the tire peripheral direction in a fitting state of the groove portion and the projection portion.

2. The pneumatic tire according to claim 1, wherein the paired groove side wall constructing the groove portion protrudes into a groove inner side than a groove bottom side position at a groove side position thereof.

3. The pneumatic tire according to claim 2, wherein the groove portion is formed as an approximately T-shaped cross sectional form having a straight line position which is orthogonal to a groove depth direction.

4. The pneumatic tire according to claim 1, wherein the predetermined area is set at a plurality of positions along the tire peripheral direction, and a first predetermined area in a state in which only the groove side wall on an inner side in the tire diametrical diction is notched, and a second predetermined area in a state in which only the groove side wall on an outer side in the tire diametrical direction is notched are alternately arranged along the tire peripheral direction.

5. The pneumatic tire according to claim 1, wherein the installation member has the projection, and a head portion which protrudes out of the tire side wall surface in an installed state, the head portion is formed as a cross sectional shape which is the same as at least a part of the projection, and the installation member is formed in its entirety as a cross sectional shape which is symmetrical in the projection side and the head portion side.

6. The pneumatic tire according to claim 1, wherein the installation member is attached to an area from a contact portion with a rim flange to a center portion in the tire diametrical direction among the tire side wall surface.

7. A pneumatic tire comprising:
a pair of bead portions;
side wall portions which extend to outer sides in a tire diametrical direction from the respective bead portions;
a tread portion which connects outer ends in the tire diametrical direction of the side wall portions; and
circular arc shaped or annular installation members each of which is structured detachably by a fitting structure between a groove portion and a projection extending in a tire peripheral direction, with respect to a tire side wall surface which reaches the tread portion from the bead portion via the side wall portion,
wherein a structure in which the groove portion and the projection interfere with each other in the tire peripheral direction is provided between the groove portion and the projection,
wherein a plurality of protruding convex portions are provided in at least any one of a predetermined surface which is at least a part of the groove surface constructing the groove portion and an opposed surface which is opposed to the predetermined surface in the installation member, and concave portions which interfere with the convex portions in the tire peripheral direction are provided.

8. The pneumatic tire according to claim 7, wherein a plurality of linear convex portions extending along a predetermined direction are arranged in both of the predetermined surface and the opposed surface, and linear concave portions extending along the predetermined direction are formed between the linear convex portions.

9. The pneumatic tire according to claim 8, wherein the predetermined direction is inclined to the tire peripheral direction.

10. The pneumatic tire according to claim 8, wherein the linear convex portions have an orthogonal surface which is orthogonal to the tire peripheral direction, on a first side in the tire peripheral direction, and an inclined surface which is inclined to the tire peripheral direction, on a second side in the tire peripheral direction.

11. The pneumatic tire according to claim 10, wherein in a case where the predetermined surface and the opposed surface are divided into a plurality of areas along the tire peripheral direction, the linear convex portions formed in a first area which is a part of the plurality of areas has an orthogonal surface which is orthogonal to the tire peripheral direction, on the first side in the tire peripheral direction, and the linear convex portion formed on a second area than the first area in the plurality of areas has an orthogonal surface which is orthogonal to the tire peripheral direction, on the second side in the tire peripheral direction.

* * * * *